United States Patent [19]

Nakamura et al.

[11] Patent Number: 5,020,394
[45] Date of Patent: Jun. 4, 1991

[54] POLYCRYSTAL DIAMOND FLUTED TOOL AND A PROCESS FOR THE PRODUCTION OF THE SAME

[75] Inventors: Tsutomu Nakamura; Tetsuo Nakai, both of Itami, Japan

[73] Assignee: Sumitomo Electric Industries, Ltd., Osaka, Japan

[21] Appl. No.: 420,483

[22] Filed: Oct. 12, 1989

[30] Foreign Application Priority Data

Oct. 14, 1988 [JP] Japan ................................ 63-257359

[51] Int. Cl.⁵ ........................ B23B 27/20; B23B 27/18
[52] U.S. Cl. ............................ 76/108.6; 76/DIG. 11; 76/DIG. 12; 407/118; 407/119; 408/144
[58] Field of Search ........ 76/108 R, 108 A, DIG. 11, 76/DIG. 12, 101 R; 407/118, 119; 408/144, 199

[56] References Cited

U.S. PATENT DOCUMENTS

| | | | |
|---|---|---|---|
| 2,901,222 | 8/1959 | Pease, Jr. | 408/144 |
| 3,309,772 | 3/1967 | Lieb et al. | 76/108 R |
| 3,514,828 | 6/1970 | Wale | 408/144 |
| 4,731,296 | 3/1988 | Kikuchi | 76/DIG. 12 |
| 4,884,476 | 12/1989 | Okuzumi | 76/DIG. 12 |

FOREIGN PATENT DOCUMENTS

| | | |
|---|---|---|
| 0166708A2 | 1/1986 | European Pat. Off. |
| 3232686A1 | 3/1984 | Fed. Rep. of Germany |
| 3522583A1 | 2/1986 | Fed. Rep. of Germany |
| 90884 | 5/1985 | Japan ...................... 408/144 |

Primary Examiner—Roscoe V. Parker
Attorney, Agent, or Firm—Wenderoth, Lind & Ponack

[57] ABSTRACT

A polycrystal diamond fluted tool is provided which is capable of effecting working with much higher accuracy and longer life as compared with the sintered diamond straight fluted tool of the prior art, and is particularly suitable for finishing working with high accuracy. The tool is produced by forming, by a vapor phase synthesis method, a polycrystal diamond film on the surface of a substrate which has been subjected to helical grinding, then subjecting the product to a chemical treatment to dissolve and remove only the substrate, brazing the resulting polycrystal diamond film in a fluted form to at least a part of the rake face of a tool base metal which has been subjected to helical grinding in a similar manner to the substrate, and then subjecting the brazed tool base metal to working of a flank face to form a cutting edge.

18 Claims, 2 Drawing Sheets

POLYCRYSTAL DIAMOND FLUTED TOOL AND A PROCESS FOR THE PRODUCTION OF THE SAME

BACKGROUND OF THE INVENTION

1. Field of the invention

This invention relates to a polycrystal diamond fluted tool and a process for the production of the same. The polycrystal diamond tool of the present invention provides a largely improved rotary tool having superior performance as compared to the sintered diamond tool of the prior art.

2. Description of the Prior Art

A diamond compact obtained by sintering diamond powder with a binder metal at an ultra-high pressure and a high temperature at which diamond is stable has the features of diamond with the highest hardness of all tool materials and does not tend to break by cleavage at a low stress as in the case of single crystal diamond. Thus, this diamond compact has been used as a cutting tool, wire drawing die, dresser, rock excavator or the like.

On the other hand, end mills, drills and reamers have been developed using sintered dies as tool materials. However, it is very difficult technically to produce a flute-shaped material by sintering at an ultra-high pressure and it is expensive to form a flute by after-working, so at the present time, such tools have been limited to straight fluted base metals or tool base metals subjected to helical grinding, which are brazed with plate-shaped tool materials.

These tools have disadvantages that the cutting edge strikes on a workpiece at a stroke, so that the cutting resistance is rapidly changed and the dimensional accuracy is lowered. Furthermore, a problem arises in that chips are not discharged well and the surface roughness of a workpiece is not good, because of not being fluted.

In order to solve these problems, there has been developed a fluted rotary tool of cemented carbide, whose cutting part is coated with a thin layer of polycrystal diamond by a vapor phase synthetic method. However, this tool has not been put to practical use yet because of the problem that the adhesiveness between a cemented carbide substrate and coating film is not sufficient and consequently, the coating film tends to be stripped during use.

SUMMARY OF THE INVENTION

It is an object of the present invention to provide a polycrystal diamond fluted tool, whereby the above described problems can be solved.

It is another object of the present invention to provide an improved revolving tool of polycrystal diamond, which is capable of working with a high accuracy and long life.

These objects can be attained by a polycrystal diamond fluted tool in which at least a part of the rake face of a fluted tool base metal is brazed with a polycrystal diamond film synthesized by a vapor phase method to form a cutting edge.

BRIEF DESCRIPTION OF THE DRAWINGS

The accompanying drawings illustrate the principle and merits of the present invention in more detail.

DETAILED DESCRIPTION OF THE INVENTION

The inventors have made various efforts to improve a rotary tool using polycrystal diamond and reached the present invention. Accordingly, the present invention provides a polycrystal diamond fluted tool in which at least a part of the rake face of a fluted tool base metal is brazed with a polycrystal diamond film synthesized by a vapor phase method to form a cutting edge, and a process for the production of a polycrystal diamond fluted tool, which comprises forming, by a vapor phase synthesis method, a film of polycrystal diamond on the surface of a substrate which has been subjected to helical grinding, then subjecting the product to a chemical treatment to dissolve and remove only the substrate, brazing the resulting polycrystal diamond film in a fluted form to at least a part of the rake face of a tool base metal which has been subjected to helical grinding in a similar manner to the substrate, and then subjecting the brazed tool base metal to working of a flank face to form a cutting edge.

Figure 1:
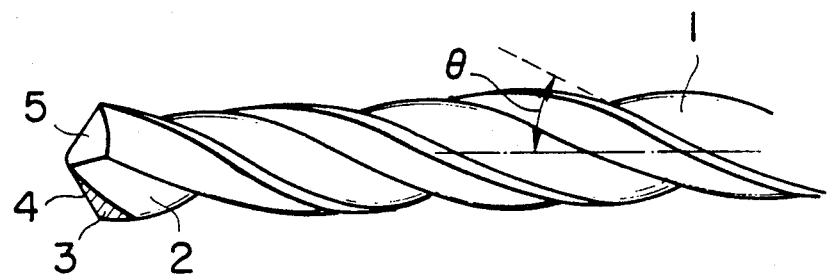
FIG. 1 is a perspective view of a drill as one embodiment of the polycrystal diamond fluted tool according to the present invention.

FIG. 1 is a perspective view of a drill as one embodiment of the polycrystal diamond fluted tool of the present invention, in which a part of a rake face 2 of a tool base metal 1 is brazed with a polycrystal diamond film 3 formed by vapor phase synthesis and 4, 5 and θ respectively designate a cutting edge, flank face and helical angle.

In the present invention, a polycrystal diamond film in the form of a flute to be a tool material is firstly formed by a vapor phase synthesis method, on the surface of a substrate having been subjected to helical grinding to give the same a flute shape as that of a tool base metal. The vapor phase synthesis can be carried out by any of known methods and in particular, methods comprising subjecting raw material gases to cracking and excitation utilizing thermoelectron radiation or plasma discharge and, methods comprising forming films using combustion flames are effective.

In view of the uniformity of film quality and film thickness, it is preferable to use a hot filament method, above all.

As the raw material gas, for example, there are used mixed gases containing, as predominant components, hydrogen and organocarbon compounds, in general, hydrocarbons such as methane, ethane, propane and the like, alcohols such as methanol, ethanol and the like, and esters. Furthermore, the raw material gas can contain inert gases such as argon, and oxygen, carbon monoxide and water in such a range that the synthesis reactions and properties of carbon are not hindered.

As the substrate, there are preferably used metals each having a coefficient of thermal expansion that is not so different from that of diamond, for example, Si, Mo, W, etc. so as to prevent the synthesized film from separation due to thermal stress. Then using these materials as the substrate, it is possible to recover effectively only the synthesized film by subjecting, after film making, the film-coated substrate to a chemical treatment, for example, by immersing in an acid to dissolve and remove the substrate.

In this way, a polycrystal diamond film with a desired flute shape can be obtained. The film thickness is generally 50 to 300 μm, preferably 100 to 200 μm, since the above described tool is ordinarily used until the wearing thereof reaches about 50 μm and it is expensive to prepare and use a film with a thickness of more than 300 μm. The helical angle is generally in the range of 5° to 50°, since if the helical angle is smaller than 5°, the performance as a fluted tool is not sufficient, while if larger than 50°, in particular, a large diameter tool material becomes long so that synthesis thereof or brazing will be difficult, and on the other hand, the tool performance is not made better.

The polycrystal diamond film in a fluted shape is then brazed directly to the rake face of a fluted tool base metal having the same helical angle using an ordinary silver or gold brazing agent or braze further containing a metal capable of forming a carbide thereof at the interface with the diamond film, such as Ti, Ta, Cr, Mn, etc. Such a metal is preferably contained in a proportion of 0.5 to 10 vol. %, since if less than the lower limit, the quantity of the carbide formed is more decreased and the bonding strength is not improved, while if more than the upper limit, the quantity of the carbide formed is so increased as to render the brazed layer brittle and the unreacted metal is oxidized with the increase of edge temperature during use to form an oxide, resulting in brittleness of the brazed layer. This brazing is preferably carried out by a method comprising using an ordinary silver braze or gold braze further containing Ti or Ta in a non-oxidizing atmosphere, or a method comprising previously coating the surface of the polycrystal diamond film to be brazed first with a Ti film having a thickness of 0.5 to 2 μm and further with a Ni film having a thickness of 1 to 10 μm by a PVD method and then subjecting to brazing with an ordinary silver braze via these coating films. In the case of the latter method, the brazing can be carried out in the air since the Ni coating serves as an anti-oxidation film of Ti.

According to these brazing methods, the resulting tool does not have any problem of peeling-off or separation of the polycrystal diamond film during use thereof as in the diamond coated tools of the prior art.

As the tool base metal, there are generally used cemented carbide alloys considering the rigidity of the tool, the difference in coefficient of thermal expansion from diamond, and the brazing property with tool materials. In particular, it is preferable to use a cemented carbide alloy containing 90 to 95% by weight of fine grain tungsten carbide of at most 1 μm in grain size from the standpoint of hardness and coefficient of thermal expansion, and cobalt. Other components can optionally be incorporated as usual.

After brazing, the resulting product is subjected to working of a flank face by a diamond wheel to form a cutting edge. Since the thus obtained tool has the polycrystal diamond film with a smaller thickness than that of the prior art sintered diamond (0.5 to 1.0 mm), working of it can be carried out in a relatively easy manner with less consumption of an abrasive or diamond wheel, and thus the working cost can be reduced. Furthermore, the tool of the present invention is free from a metal binder that the sintered diamond of the prior art contains, thus resulting in a very excellent cutting property.

The fluted tool of the present invention, prepared by the above described method, exhibits much more improved performance as well as higher stability and is favorably compared with the prior art tool using sintered diamond or diamond coated tool.

As illustrated above, according to the method of the present invention, comprising brazing a polycrystal diamond film prepared in a fluted form by vapor phase synthesis to a tool base material having the same flute form, a fluted cutting edge can readily be realized and the adhesiveness of the base material to the diamond film can largely be improved. Therefore, the polycrystal diamond fluted tool of the present invention is capable of effecting working with much higher accuracy and longer life as compared with the sintered diamond straight fluted tool of the prior art, and is particularly suitable for finishing working with high accuracy.

The following examples are given in order to illustrate the present invention in greater detail without limiting the same.

EXAMPLE 1

A round bar of Mo having a diameter of 10 mm was subjected to helical grinding with a helical angle of 20° and cut in a length of 20 mm. Using the product as a substrate, a polycrystal diamond fluted film was synthesized by means of a microwave plasma CVD apparatus under the following conditions:

Raw Material Gas (flow rate): $H_2$ 200 ml/min, $CH_4$ 10 ml/min, Ar 100 ml/min
Pressure: 150 torr
Microwave output: 700 W
Synthesis Time: 8 hours When the recovered sample was immersed in hot aqua regia for 30 minutes to dissolve and remove only the Mo substrate, a black and semitransparent polycrystal diamond film with a thickness of 0.1 mm and a fluted shape of 2 mm in width, 20 mm in length and 20° in helical angle was obtained. The resulting polycrystal film showed a density of 3.51 as a result of measurement and a diamond single phase by identification using a Raman spectrum.

Figure 2:
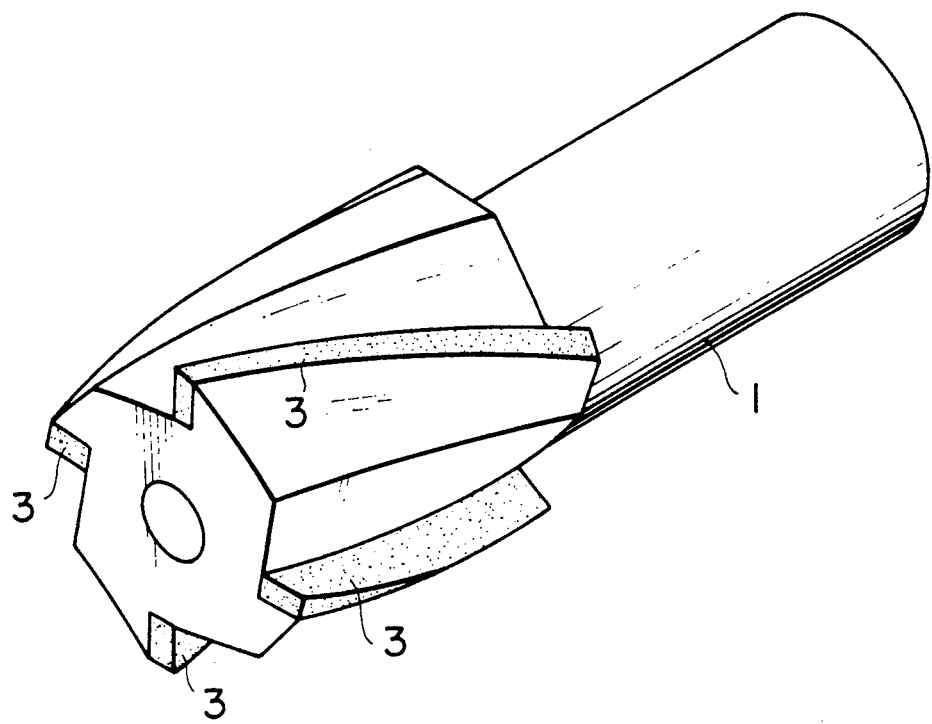
FIG. 2 is a perspective view of an end mill as another embodiment of the polycrystal diamond fluted tool according to the present invention.

Two samples of the polycrystal diamond were prepared and subjected to coating of the grown surface with Ti and Ni to give respectively a film thickness of 1 μm and 2 μm. On the other hand, a round bar of 10 mm in diameter, made of a cemented carbide containing 95% by weight of WC having a grain diameter of 1 μm and the balance Co, was subjected to helical grinding with a helical angle of 2° to prepare a fluted shank. The above described coated polycrystal diamond film was silver-brazed using BAg-4 (JIS Standard) in the air to along the rake face of the shank. Then, only the flank face thereof was worked by a diamond wheel to form a cutting edge, thus obtaining a polycrystal diamond fluted end mill as shown in FIG. 2, in which 1 designates a tool base metal and 3 designates a polycrystal diamond film.

Evaluation of the thus obtained tool was carried out by subjecting it to working of a VTR chassis of 200 mm-square ADC 12 (commercial name, Al-11% Si die casting) under working conditions of:

Revolving Number: 800 rpm
Feed: 0.05 mm/edge
Cutting Depth: 0.5 mm
by Wet Process For comparison, evaluation of the following comparative samples was similarly carried out:

COMPARATIVE EXAMPLE 1

Figure 3A:
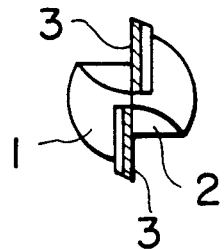
FIG. 3 (a) and (b) are respectively a front view and side view of a straight end mill of two flutes using sintered diamond as a tool material according to the prior art.
Figure 3B:
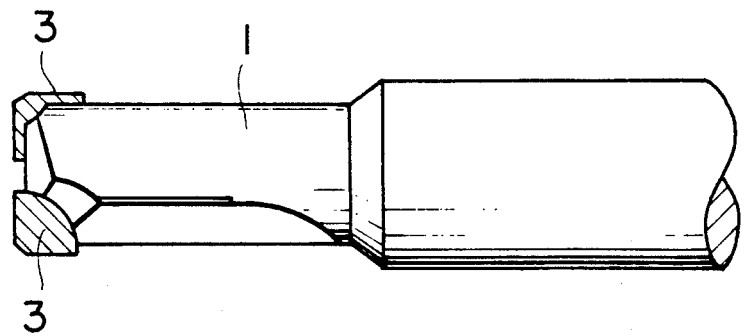

A straight end mill of two flutes and 10 mm in diameter using a sintered diamond with a shape as shown in FIG. 3, in which 1 designates a tool base metal and 3 designates sintered diamond.

COMPARATIVE EXAMPLE 2

A solid end mill of a cemented carbide having the same composition as used in the tool base metal of Example 1, a diameter of 10 mm and a helical angle of 30°.

COMPARATIVE EXAMPLE 3

The solid end mill of the cemented carbide of Comparative Example 2, the surface of which is coated with a diamond film of 3 $\mu$m thickness.

In Table 1 are shown results obtained by evaluation of the tool life when the worked surface roughness Rmax became 3 $\mu$m or more. It is apparent from these results that the polycrystal diamond fluted end mill of Example 1 according to the present invention shows less quantity of wearing and a longer tool life due to good discharge of chips than the sintered diamond straight fluted end mill or the cemented carbide end mill of the prior art, and does not meet with separation of the polycrystal diamond film as in the diamond coated end mill of the prior art.

TABLE 1

| Example No. | Tool | Number of Workpieces Worked During Useful Life |
| --- | --- | --- |
| Example 1 (Present Invention) | Polycrystal Diamond Fluted End Mill | 120,000 |
| Comparative Example 1 | Sintered Diamond Straight Flute End Mill | 50,000 |
| Comparative Example 2 | Cemented Carbide Solid End Mill | 1,000 |
| Comparative Example 3 | Diamond Coated End Mill | Separation of Coating Film after Working of 30,000 Samples |

EXAMPLE 2

A round bar of Si having a diameter of 6 mm was subjected to helical grinding with a helical angle as shown in Table 2 by means of a diamond wheel and then cut in a length of 5 mm. Using the product as a substrate, a polycrystal diamond film was synthesized by a hot filament method using a wire of W of 0.5 mm in diameter and 20 mm in length as a thermoelectron radiation material under synthesis conditions as shown in Table 2. Identification of each thus synthesized film showed that it contained no amorphous carbon and consisted of a diamond single phase.

Separation of the synthesized film from the substrate was carried out by immersing the sample in a mixture of hydrofluoric acid and nitric acid heated at 80° C. for 1 hour to dissolve and remove only Si. The recovered synthesized film was washed with alcohol and then brazed to a shank of a cemented carbide alloy fluted in the corresponding flute angle and having the same composition as that of Example 1 by the use of an Au-Ti braze (Ti 5 vol. %) in vacuum, which was then worked to form a margin part and end cutting edge part by means of a diamond wheel, thus obtaining a drill.

Each of the resulting drills was subjected to holemaking of an A 390 alloy (commercial name, Al-17% Si alloy, T6 heat treated alloy) to evaluate its performance under cutting conditions of:
Revolving Number: 5000 rpm
Feed: 0.3 mm/rev
Wet Process

TABLE 2

| Sample No. | Composition of Raw Material | | | Gas Flow Rate (SCCM) | Gas Pressure (Torr) | Substrate Temperature (°C.) | Filament Temperature (°C.) | Helical Angle (°) |
| --- | --- | --- | --- | --- | --- | --- | --- | --- |
| | $H_2$ | $CH_4$ | $C_2H_5OH$ | | | | | |
| A | 97.5 | 2.5 | — | 200 | 100 | 800 | 2000 | 3 |
| B | 99.2 | 0.8 | — | 500 | 150 | 750 | 2200 | 25 |
| C | 98.5 | — | 1.5 | 300 | 80 | 900 | 2100 | 25 |
| D | 98.2 | 1.8 | — | 400 | 120 | 850 | 2050 | 55 |

In Table 3 are shown the above described test results with those of comparative tools of 6 mm in diameter, i.e., a sintered diamond drill using a plate-shaped sintered diamond with an average grain size of 10 $\mu$m as a tool material, a cemented carbide drill having the same composition as the tool base metal of Example 2, and a diamond coating drill consisting of this cemented carbide drill the surface of which was coated with a diamond film with a thickness of 10 $\mu$m.

TABLE 3

| Tool | Cutting length until $V_B = 0.3$ mm (m) |
| --- | --- |
| Example 1 (Present Invention) | |
| Sample A | 200 |
| Sample B | 380 |
| Sample C | 420 |
| Sample D | 400 |
| Comparative Tools | |
| Sintered Diamond Drill | broken at cutting point of 10 m |
| Cemented Carbide Drill | 30 |
| Diamond Coating Drill | Separated at cutting point of 50 m |

It will clearly be understood from these results that the tool with a smaller helical angle, i.e., Sample A does not give sufficient performances, but Sample B to D have more excellent performances by at least 10 times than the cemented carbide drill.

EXAMPLE 3

A mixed gas of $C_2H_6$ and $H_2$ in a proportion by volume of 1:100 was fed to a reaction tube in which each of the substrates as shown in Table 4 was placed at a flow rate of 200 ml/min while adjusting the pressure to 180 Torr.

TABLE 4

| Sample No. | Substrate Material | Helical Angle (°) |
|---|---|---|
| E | W | 25 |
| F | Mo | 15 |
| G | Si | 20 |

Then, the gas in the reaction tube was excited to form a plasma by applying an output of 900 W from a high frequency oscillator (13.56 MHz) to a high frequency coil through a coaxial cable. When this condition was maintained for 10 hours, a polycrystal diamond film with a thickness of 0.2 mm was formed on the surface of each of the substrates. After dissolving out and removing the substrate by an acid treatment, the thus resulting polycrystal diamond film was used as a tool material and brazed with a braze of 93 vol. % Au-7 vol. % Ta to a tool base metal of a cemented carbide containing 90% by weight of WC with a grain diameter of 0.5 μm and 5% by weight of Co and 5% by weight of Ni, having a diameter of 10 mm, which had been subjected to helical grinding with the corresponding helical angle, thus preparing a reamer.

Evaluation of the performance of these reamers was carried out by subjecting them to finishing hole-making using, as a workpiece, ADC 12 Alloy (commercial name) of 20 mm in thickness, having a hole of 9.5 mm in diameter with a key way, under cutting conditions of a revolving number of 3200 rpm and a feed of 0.2 mm/rev.

Evaluation of comparative tools was similarly carried out as to a straight flute reamer of the prior art using sintered diamond as a tool material, a reamer of a cemented carbide having a helical angle of 25° and the same composition as the tool base metal of Example 3, and a reamer consisting of this cemented carbide reamer the surface of which was coated with a polycrystal diamond film with a thickness of 3 μm.

The evaluation results are shown in Table 5. It is apparent from these test results that the reamers of the present invention all have a higher wear resistance and are capable of working with higher accuracy because of the fluted shape.

TABLE 5

| Tool | Number of Workpieces Worked until $V_B$ = 0.05 | Degree of True Circle until $V_B$ = 0.05 (μm) |
|---|---|---|
| Example 3 (Present Invention) | | |
| Sample E | 120,000 | 2.7 |
| Sample F | 110,000 | 2.8 |
| Sample G | 115,000 | 2.7 |
| Comparative Tools | | |
| Sintered Diamond Straight Fluted Reamer | 50,000 | 5.2 |
| Cemented Carbide Fluted Reamer | 7,000 | 4.5 |
| Diamond Coating Fluted Reamer | separated at working point of 30,000 | |

What is claimed is:

1. A polycrystal diamond fluted tool, in which at least a part of the rake face of a fluted tool base metal of a cemented carbide alloy is brazed with a polycrystal diamond film synthesized by a vapor phase method to form a cutting edge.

2. The polycrystal diamond fluted tool as claimed in claim 1, wherein the brazing is carried out directly or through a Ti layer and Ni layer.

3. The polycrystal diamond fluted tool as claimed in claim 1, wherein the polycrystal diamond film has a thickness of 50 to 300 μm.

4. The polycrystal diamond fluted tool as claimed in claim 1, wherein the fluted tool base metal has a helical angle of 5° to 50°.

5. The polycrystal diamond fluted tool as claimed in claim 1, wherein the grown surface of the polycrystal diamond film is brazed to the cemented carbide alloy.

6. The polycrystal diamond fluted tool as claimed in claim 1, wherein the brazing is carried out using a silver braze containing Ti or Ta.

7. The polycrystal diamond fluted tool as claimed in claim 1, wherein the cemented carbide alloy contains 90 to 95% by weight of fine grain tungsten carbide powder with a grain diameter of at most 1 μm.

8. A process for the production of a polycrystal diamond fluted tool, which comprises forming, by a vapor phase synthesis method, a polycrystal diamond film on the surface of a substrate which has been subjected to helical grinding, then subjecting the product to a chemical treatment to dissolve and remove only the substrate, brazing the resulting polycrystal diamond film in a fluted form to at least a part of the rake face of a tool base metal which has been subjected to helical grinding in a similar manner to the substrate, and then subjecting the brazed tool base metal to working of a flank face to form a cutting edge.

9. The process for the production of a polycrystal diamond fluted tool, as claimed in claim 8, wherein the brazing is carried out directly or through a Ti layer and Ni layer.

10. The process for the production of a polycrystal diamond fluted tool, as claimed in claim 8, wherein the polycrystal diamond film has a thickness of 50 to 300 μm.

11. The process for the production of a polycrystal diamond fluted tool, as claimed in claim 8, wherein the tool base metal is in a fluted form with a helical angle of 5° to 50°.

12. The process for the production of a polycrystal diamond fluted tool, as claimed in claim 8, wherein the tool base metal is of a cemented carbide alloy.

13. The process for the production of a polycrystal diamond fluted tool, as claimed in claim 12, wherein the cemented carbide alloy contains 90 to 95% by weight of fine grain tungsten carbide alloy powder with a grain diameter of at most 1 μm.

14. The process for the production of a polycrystal diamond fluted tool, as claimed in claim 8, wherein the brazing is carried out using a silver braze containing Ti or Ta.

15. The process for the production of a polycrystal diamond fluted tool, as claimed in claim 8, wherein the vapor phase synthesis method is carried out by the use of thermoelectron radiation, plasma discharge or combustion flame.

16. The process for the production of a polycrystal diamond fluted tool, as claimed in claim 8, wherein the vapor phase synthesis method is carried out by the use of a raw material gas selected from mixed gases containing, as predominant components, hydrogen and organo-carbon compounds.

17. The process for the production of a polycrystal diamond fluted tool, as claimed in claim 8, wherein the substrate consists of at least one member selected from the group consisting of Si, Mo and W.

18. The process for the production of a polycrystal diamond fluted tool, as claimed in claim 8, wherein the chemical treatment is carried out with a strong acid.

* * * * *